US009734932B2

(12) United States Patent
Gordon et al.

(10) Patent No.: US 9,734,932 B2
(45) Date of Patent: Aug. 15, 2017

(54) NEGATIVE DIELECTRIC CONSTANT MATERIAL BASED ON ION CONDUCTING MATERIALS

(71) Applicant: The United States of America as represented by the Administrator of the National Aeronautics and Space Administration, Washington, DC (US)

(72) Inventors: Keith L. Gordon, Hampton, VA (US); Jin Ho Kang, Newport News, VA (US); Cheol Park, Yorktown, VA (US); Peter T. Lillehei, Newport News, VA (US); Joycelyn S. Harrison, Arlington, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 294 days.

(21) Appl. No.: 14/253,317

(22) Filed: Apr. 15, 2014

(65) Prior Publication Data

US 2014/0287904 A1    Sep. 25, 2014

Related U.S. Application Data

(62) Division of application No. 12/893,289, filed on Sep. 29, 2010, now Pat. No. 8,696,940.

(60) Provisional application No. 61/256,577, filed on Oct. 30, 2009.

(51) Int. Cl.
*H01B 1/12* (2006.01)
*G02F 1/00* (2006.01)
(Continued)

(52) U.S. Cl.
CPC ............... *H01B 3/38* (2013.01); *C08G 73/18* (2013.01); *C08L 79/04* (2013.01); *H01B 1/12* (2013.01);
(Continued)

(58) Field of Classification Search
CPC ... H01B 1/00; H01B 1/12; H01B 1/20; C08K 3/28; C08K 3/32; G02F 1/0009; G02F 1/133707
See application file for complete search history.

(56) References Cited

U.S. PATENT DOCUMENTS 5,563,182 A * 10/1996 Epstein .............. C08G 73/0266
522/146

OTHER PUBLICATIONS

J.H. H Kang, C. Park, K. L. Gordon, P.T. Lillehei, and J.S. Harrison "A Novel Negative Dielectric Constant Material Based on Phosphoric Acid Doped Poly (benzimidazole)" Presentation Boston, MA Dec. 5, 2008.*

(Continued)

*Primary Examiner* — Mark Kopec
(74) *Attorney, Agent, or Firm* — Jennifer L. Riley

(57) ABSTRACT

Metamaterials or artificial negative index materials (NIMs) have generated great attention due to their unique and exotic electromagnetic properties. One exemplary negative dielectric constant material, which is an essential key for creating the NIMs, was developed by doping ions into a polymer, a protonated poly (benzimidazole) (PBI). The doped PBI showed a negative dielectric constant at megahertz (MHz) frequencies due to its reduced plasma frequency and an induction effect. The magnitude of the negative dielectric constant and the resonance frequency were tunable by doping concentration. The highly doped PBI showed larger absolute magnitude of negative dielectric constant at just above its resonance frequency than the less doped PBI.

16 Claims, 5 Drawing Sheets

Figure 1:
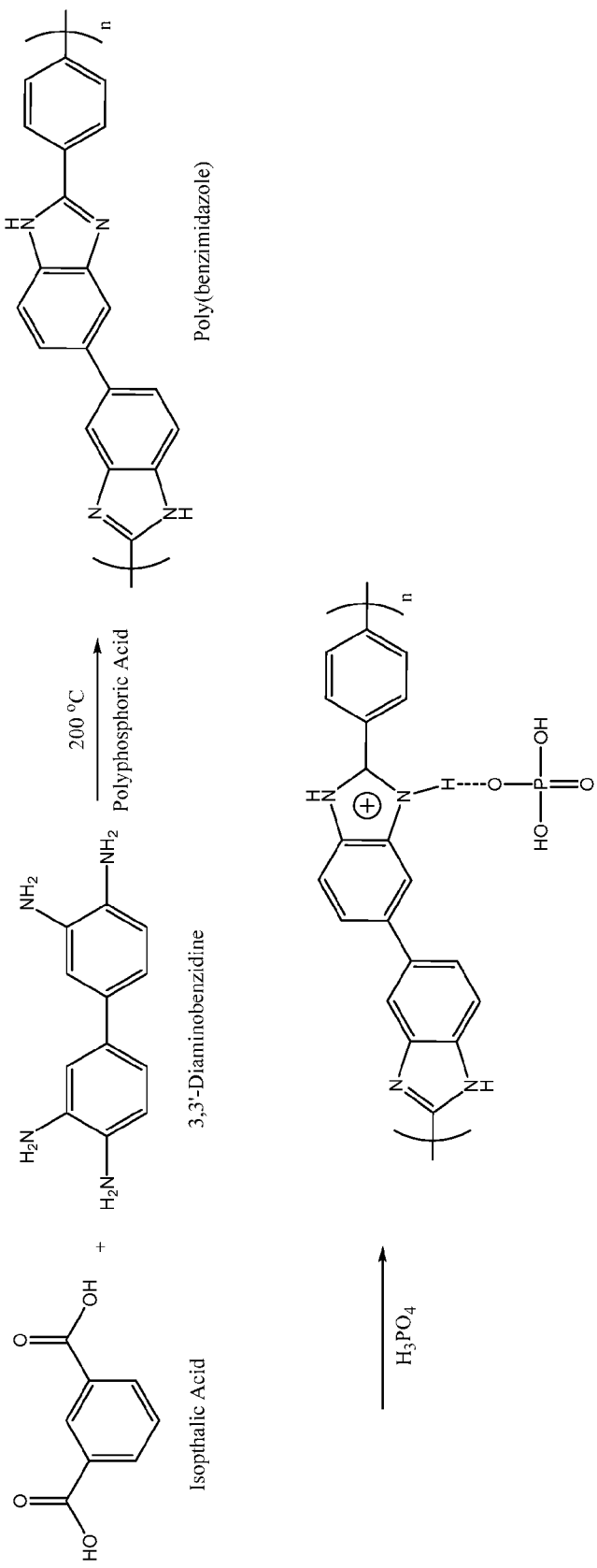

(51) Int. Cl.
*H01B 3/38* (2006.01)
*C08G 73/18* (2006.01)
*C08L 79/04* (2006.01)
*H01B 3/12* (2006.01)

(52) U.S. Cl.
CPC ............ *H01B 3/12* (2013.01); *G02F 1/0009* (2013.01); *G02F 2202/30* (2013.01); *G02F 2202/42* (2013.01)

(56) References Cited

OTHER PUBLICATIONS

Glipa et al "Investigation of the conduction properties of phosphoric and sulfuric acid doped polybenzimidazole", J. Mater. Chem., 1999, 9, 3045-3049.*

R. Bouchet, and E. Siebert, Solid State Ionics, 1999, 118, 287. "Proton Conduction in acid Doped Polybenzimidazole".*

Pu et al "Proton transport in polybenzimidazole blended with H3PO4 or H2SO4", Journal Polymer Science: Part B, Polymer Physics (40, 663-669) 2002.*

Carollo et al "Developments of new proton conducting membranes . . . ", Journal of Power Sources 160 (2006) 175-180.*

Kim et al "Synthesis of Poly(2,5-benzimidazole) for use as a fuel cell membrane", Macromolecular Rapid Comm. 2004, 25, 894-897.*

He et al "Dpoing phosphoric acid in polybenzimidazole membranes . . . ", Journal of Polymer Science: Part A: Polymer Chemistry 45, 2989-2997 (2007).*

* cited by examiner

US 9,734,932 B2

NEGATIVE DIELECTRIC CONSTANT MATERIAL BASED ON ION CONDUCTING MATERIALS

ORIGIN OF THE INVENTION

This invention was made in part by employees of the United States Government and may be manufactured and used by or for the Government of the United States of America for governmental purposes without the payment of any royalties thereon or therefor. This patent application is a divisional of and claims the benefit of and priority to U.S. patent application Ser. No. 12/893,289, filed Sep. 29, 2010, (now U.S. 8,696,940 B2 issued on Apr. 15, 2014), which claims the benefit of priority to U.S. Provisional Patent Application Ser. No. 61/256,577, filed Oct. 30, 2009. The contents of the foregoing applications are hereby incorporated by reference in their entirety.

FIELD OF THE INVENTION

The present invention relates generally to negative index materials.

BACKGROUND

Metamaterials or artificial Negative Materials (NIM) are a new class of electromagnetic materials or structures that have generated great attention over the last ten years due to their unique and exotic electromagnetic properties. They are constructed with specially designed inclusions and architecture in order to exhibit a negative index of refraction, which is a property not found in any known naturally occurring material. These artificially configured composites have a potential to fill voids in the electromagnetic spectrum where conventional material cannot access a response, and enable the construction of novel devices such as microwave circuits and antenna components, The negative effective dialectic constant is a very important key for creating materials with a negative refractive index.

To achieve a negative dielectric constant, two main approaches have been employed in the art. One approach involves the use of a periodic structure whose frequency spectrum mimics the response of a high pass filter or a waveguiding structure, for example, a hollow metallic waveguide loaded with periodic split ring resonators. Under this condition, electromagnetic waves are evanescent at low frequencies and this evanescence in the small frequency gap is described in terms of negative permittivity values below some specific frequency (i.e., the corner (or cutoff) frequency). The second approach involves the use of a composite comprising of metal inclusions in a dielectric matrix. It has been verified experimentally on a micrometer level that the effective dielectric constant of a composite containing conducting micro-fibers (diameter ~25 μm) was negative at GHz frequencies. It has also been proposed that a composite that consists of short ferromagnetic wires embedded into a dielectric matrix, can exhibit a tunable effective negative dielectric constant under a DC magnetic field.

The first approach in the on involves assembling periodic geometrical structures made up of inductors and capacitors on a micrometer scale, which is extremely difficult and not readily applicable for producing commercial metamaterials with conventional materials. The second approach in the art of using metal inclusions is not desirable because of the difficulty in making a homogenous material without aggregation. The limitation of tunability of the resonance frequency is another big problem with the two approaches, since the resonance frequency can be tuned only by dimensional change of the components in these systems. Accordingly, new ways of manufacturing materials, and materials themselves, are being continuously sought.

BRIEF SUMMARY

One object of the invention is to provide Metamaterials or artificial negative index materials (NIMs) having unique and exotic electromagnetic properties. In one embodiment, negative dielectric constant materials, which arc essential keys for creating the NIMs, have been developed by doping ions into polymers, such as with a protonated poly(benzimidazole) (PBI). Such exemplary doped PBI shows a negative dielectric constant at megahertz (MHz) frequencies due to its reduced plasma frequency and an induction effect. The magnitude of the negative dielectric constant and the resonance frequency were tunable by doping concentration. Highly doped PBI showed larger absolute magnitude of negative dielectric constant and lower resonance frequency at just above its resonance frequency than the less doped PBI.

In another embodiment of the invention, a method of manufacturing an effectively homogeneous negative dielectric material comprises providing a dielectric material, doping ions into the dielectric material, and recovering an effectively homogeneous negative dielectric material. The dielectric material may comprise dielectric ceramics, polymers or composites thereof.

In yet another embodiment, wherein the dielectric material comprises a polymer, the step of doping ions into the polymer can include: (1) immersing the polymer into an acid solution for a predetermined period of time at a predetermined temperature; (2) removing the doped polymer from the acid solution; (3) drying the doped polymer; and (4) heating the doped polymer for a predetermined period of time at a predetermined temperature. One preferred polymer includes poly(benzimidazole), One preferred acid solution includes an aqueous phosphoric acid solution. Such phosphoric acid solution has a predefined concentration range, such as from about 0.001 wt % to about 90 wt %. The polymer can be immersed into the aqueous acid solution for a time of about 1 second to about 480 hours at a temperature range of about −20° C. to about 80° C., The polymer may be heated for a time of about 1 second to about 480 hours at a temperature range of about room temperature to about 110° C.

In addition to the method of manufacturing a negative dielectric material, as described above, still other aspects of the present invention are directed to corresponding negative dielectric materials themselves.

BRIEF DESCRIPTION OF THE SEVERAL VIEWS OF THE DRAWING(S)

Figure 2A:
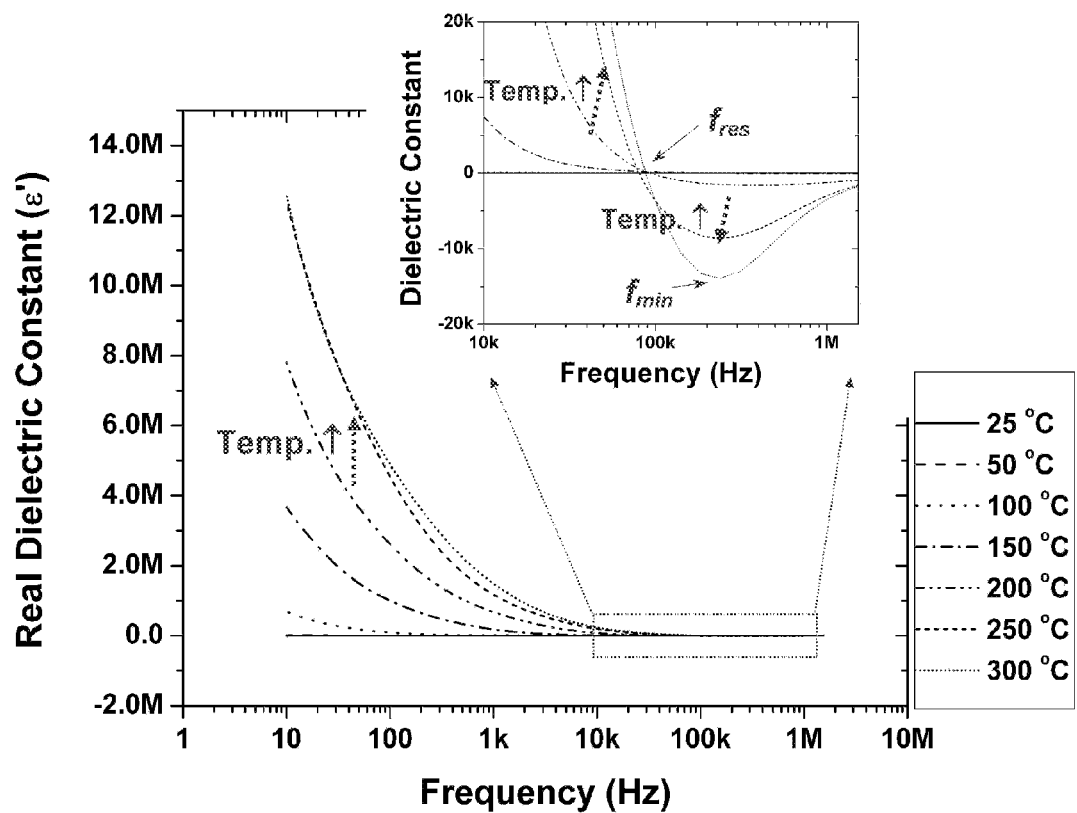
Figure 2B:
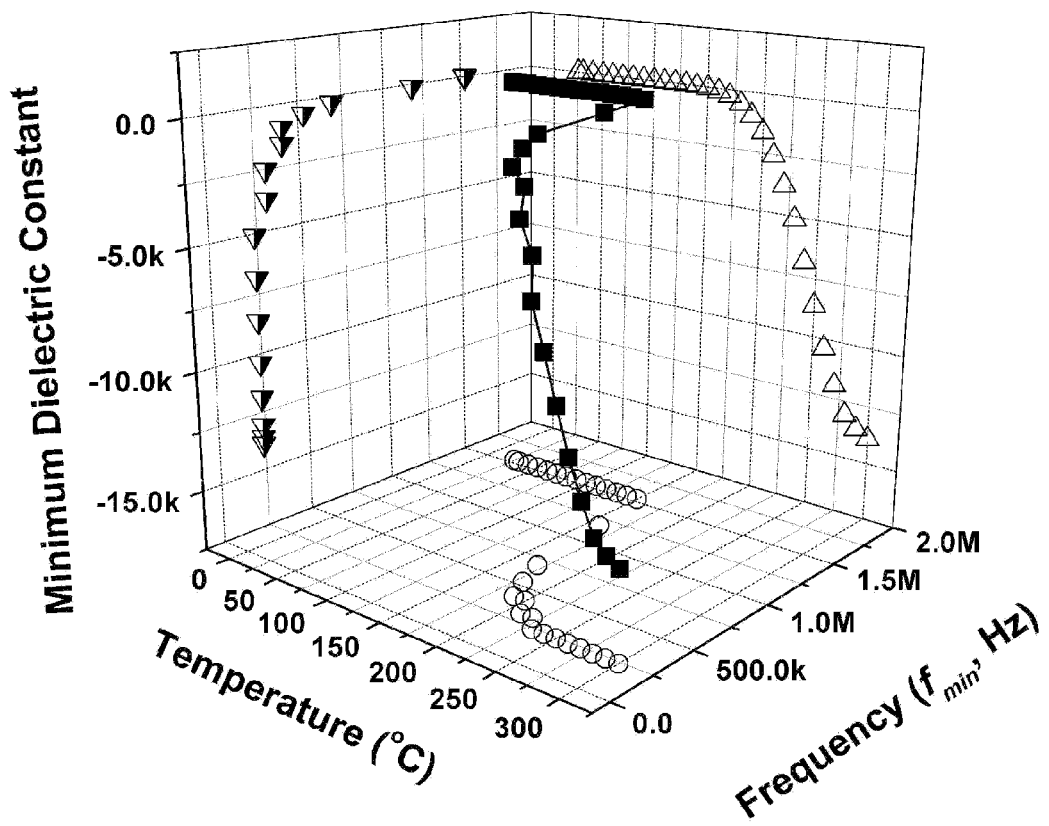
Figure 3A:
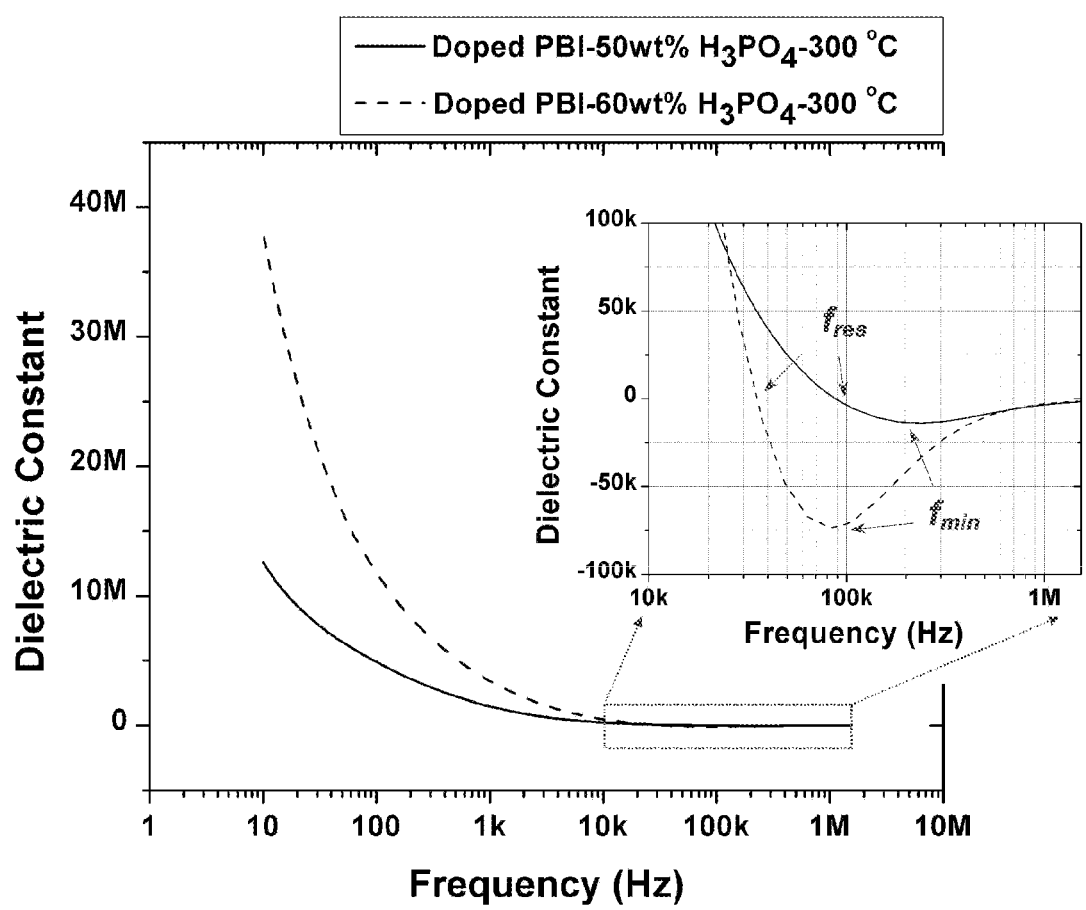
Figure 3B:
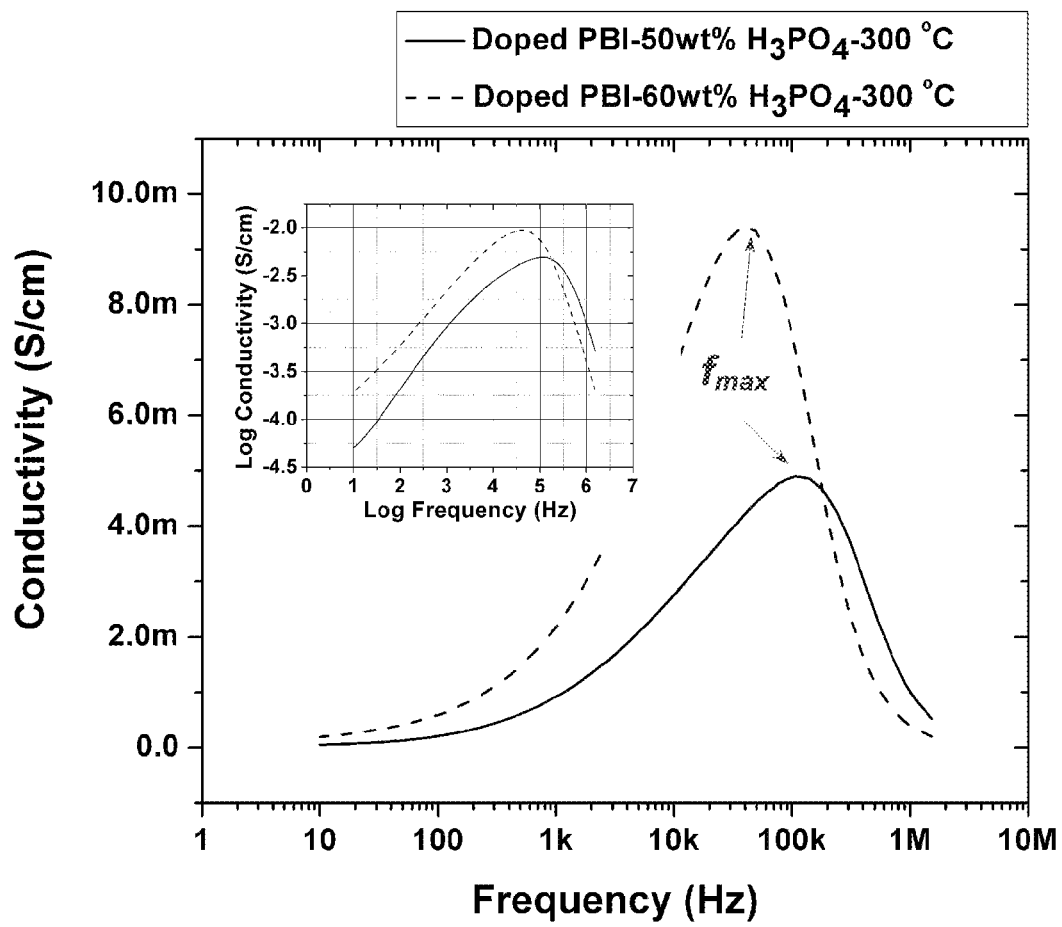

Having thus described the invention in general terms, reference will now be made to the accompanying drawings, which are not necessarily drawn to scale, and wherein:

FIG. 1 illustrates the synthesis of phosphoric acid doped poly(benzimidazole), in accordance with embodiments of the present invention;

FIGS. 2A and 2B illustrate the dielectric constant of PBI doped with 50 wt % of $H_3PO_4$ aqueous solution as functions of frequency and temperature (FIG. 2A) and a 3-D plot of minimum dielectric constant, temperature and frequency (FIG. 2B); and FIGS. 3A and 3B illustrate a comparison of dielectric constant (FIG. 3A) and conductivity (FIG. 3B) of PBI doped with different concentration of $H_3PO_4$ aqueous solution.

DETAILED DESCRIPTION

Embodiments of the invention include negative dielectric materials and methods of manufacturing negative dielectric materials. A negative dielectric constant material was developed by doping ions into poly(benzimidazole) (PBI). The doped PBI showed a negative dielectric constant at megahertz (MHz) frequencies due to its reduced plasma frequency and an induction effect. The magnitude of the negative dielectric constant and the resonance frequency were tunable by doping concentration. The highly doped PBI showed larger absolute magnitude of negative dielectric constant and lower. Specifically, the PBI doped with 60 wt % phosphoric acid solution showed a very large absolute magnitude of negative dielelectric constant of a very large absolute magnitude of negative dielelectric constant of $-7.35 \times 10^4$ at 300° C. and $8.28 \times 10^4$ Hz and the PBI doped with 50 wt % phosphoric acid solution showed a smaller absolute magnitude of negative dielectric constant of $-1.39 \times 10^4$ at 300° C. and higher frequency $1 \times 10^5$ Hz. As temperature increased, the dielectric behavior changed from a relaxation spectrum to a resonance spectrum showing larger magnitude of negative dielectric constant at a lower frequency. The conductivity of the doped PBI measured as a function of both temperature and frequency followed the same trend as the dielectric constant. With respect to the dielectric constant and the conductivity data, the origin of the negative dielectric constant was attributed to the resonance behavior of the high mobility of ions at elevated temperatures and high frequencies. The utilization of the developed negative dielectric material thus provides novel approaches for making unique optical and microwave devices such as filters and switches.

Without wishing to be bound by any one theory, one aspect of the invention involves doping high mass charge carriers into materials to make homogenous negative dielectric materials with reduced plasma frequencies ($\omega_p$). It is well known that below the plasma frequency, $\omega_p$, the dielectric constant of a conductive metal is negative. For example, the dielectric constant of aluminum is negative below its high plasma frequency, $\omega_p$ of 15 eV ($3.63 \times 10^{15}$ Hz), with the small mass of charge carriers, electrons ($m_e \sim 9.11 \times 10^{-31}$ kg). However, if the effective mass of charge carrier increases, the plasma frequency can be lowered. For example, if the charge carriers are mainly heavy ions, the ions oscillate under an electric field at their ionic plasma frequency ($\omega_p^*$) given by $\omega_p^* \approx \omega_p \cdot (m_e/m_i)^{0.5}$, where $m_e$ is the effective mass of electron and $m_i$ is the effective mass of ion. Thus, the ions oscillate at much lower plasma frequencies than the electrons. In general, the material doped with ions is very homogeneous at the molecular level in contrast to other multiphase composites with metallic inclusions. The induction of highly conductive dopants (ions or nano-scale inclusions) of the material can influence the resonance spectrum, which is another synergetic benefit for making negative dielectric constant material at a lower frequency. The value of negative dielectric constant and the resonance frequency can be tuned as a function of dopant concentration and the use temperature. Based on this principle, one exemplary negative dielectric material was developed with ion doped conducting polymers and a phosphoric acid doped poly (benzimidazole).

Poly(benzimidazole) (PBI) was prepared using a modification of previously reported synthesis methods. The general process of the solution polycondensation reaction began with Poly(phosphoric acid) (PPA) being added to a 250 ml three-necked flask equipped with a mechanical stirrer, a nitrogen inlet and outlet. The flask was immersed in an oil bath and stirred at 80° C. for several hours to remove residual air from the flask. The temperature of the PPA was taken to 140° C. and a stoichiometric ratio mixture of 3,3'-diaminobenzidine (DAB) and isophthalic acid (IPA) was charged into the flask under nitrogen flow while stirring. The reaction mixture was vigorously stirred at 140° C. for 5 hours and 200° C. for 18 hours. The hot slurry solution was poured into water for precipitation and the precipitated polymer was immersed in a 5 wt % $Na_2CO_3$ aqueous solution for at least 24 hours. The polymer was obtained by vacuum filtration, washed with deionized water, and dried in a vacuum oven at 110° C. overnight.

The PBI films were prepared from 5% (w/v) solutions in N, N'-dimethylacetamide (DMAc). The filtered polymer solutions in DMAc were heated with vigorous stirring for several hours to facilitate dissolution of PBI. The polymer solutions were poured onto glass plates and were placed in a dry box for 48 hours to form membranes. The membranes were oven dried at 100° C. for 1 hr and 200° C. for 1 hr. The films were isolated from the glass plates in cold water. The PBI membrane was then dried at 100° C. for 24 hours under vacuum. The acid-doped PBI film was obtained by immersing the membrane in various concentrations of aqueous phosphoric acid (i.e. 50 or 60 wt %) solution for 48 hours at room temperature. The doped polymer membrane was blot dried with a paper towel and placed in an oven at 40° C. for 24-48 hours under vacuum. After the membrane was dried, it was weighed to determine the amount of phosphoric acid uptake. The doping level of the membranes was determined by the concentration of phosphoric acid, with the doping level of a PBI membrane immersed into a 60 wt % phosphoric acid solution for 48 hours being as high as five phosphoric acid molecules per repeat unit. A summary synthesis scheme of phosphoric acid doped PBI is illustrated in FIG. 1.

The infrared (IR) spectra of pure PBI and doped PBI were measured. The interactions between PBI membranes and phosphoric acid were extensively studied by Infrared Spectroscopy. For PBI, a broad peak corresponding to the free N—H stretch and the self-associated, hydrogen bonded N—H groups were observed in the spectral region 4000-2500 $cm^{-1}$. The absence of a carbonyl peak in the spectral region 1540-1870 $cm^{-1}$ confirmed ring closure. Also, the C=C and C=N stretching vibrations were observed at 1606 $cm^{-1}$, in-plane heterocyclic ring vibrations were observed at 1444 $cm^{-1}$, a breathing imidazole ring stretch was observed at 1287 $cm^{-1}$ and a strong absorption for out of plane C—H bending for benzene rings was observed at 799 $cm^{-1}$ All of which were conclusive for benzimdazoles. For the $H_3PO_4$ doped PBI films, we confirmed that the IR spectrum of the PBI was greatly modified after protonation and complexation with phosphoric acid. A broad and intense band in the 2000-3500 $cm^{-1}$ was the result of the presence of protonated PBI, the complexation with phosphoric acid, and the existence of strong hydrogen bonding. $H_3PO_4$ protonated benzimidazole rings, resulting in the formation of anions. Absorption bands in the 500-1300 $cm^{-1}$ spectral region were characteristic of anions. $H_2PO_4^-$ anion was the predominant anion in the entire concentration range. The $H_2PO_4^-$ anions in the membrane play a dominant role in the proton conductivity because they contain both proton acceptor and donor sites, allowing them to contribute to the overall proton transport in the system. The anions of phosphoric acid were believed to be immobilized and held by the PBI matrix by strong hydrogen bonding thus forming an effective network for proton transport.

A series of dielectric spectra of the 50% doped FBI at various temperatures as a function of frequency has been determined and is shown in FIG. 2A. The dielectric constant decreased with increasing frequency. When the sample was measured at 25° C., the dielectric constant was 118 at 10 Hz and decreased to 7.65 at $1 \times 10^6$ Hz. When the dielectric constant was measured at elevated temperatures, the dielectric constant increased with increasing temperature. The dielectric constant measured at 10 Hz and 300° C. was 5 orders of magnitude higher than that measured at 10 Hz and 25° C. Most interestingly, the dielectric constant resonance spectrum appeared in the range of $1 \times 10^5$ Hz and $1 \times 10^6$ Hz. It exhibited a transition from positive to negative value, reaching minimum at around $1 \times 10^5$ Hz.

The increase in the dielectric constant at a low frequency was indicative of the presence of interfacial polarization. This led to field distortion and gave rise to induced dipole moments. This effect was prevalent at low frequencies since the dipole relaxation time of this type of polarization was large. In the example system, there was an abundance of mobile ions present, which resulted in significant interfacial polarization. Without wishing to be bound by any one theory, the increase of the dielectric constant at low frequencies with increasing temperatures is believed to be explained by the higher polarization resulting from the higher mobility of doped ions.

In order to understand the dielectric constant resonance behavior, the minimum dielectric constant and the frequency at the minimum ($f_{min}$) just above resonance frequency ($f_{res}$), were recorded at each temperature as shown in FIG. 2B. The minimum dielectric constant slightly increased from 7.65 to 19.1 over the temperature range of 25 to 120° C. Above 130° C., the minimum dielectric constant began to decrease gradually and reached a negative value of −124 at a temperature of 160° C. Above 160° C., the minimum dielectric constant decreased steeply and reached $-1.39 \times 10^4$ at a temperature of 300° C. Over the temperature range of 25 to 150° C., the dielectric constant kept decreasing with increasing frequency and the $f_{min}$ frequency remained constant because no $f_{min}$ frequency appeared up to $1.53 \times 10^6$ Hz, which was the highest measuring frequency limit. As the temperature increased above 160° C., the $f_{min}$ frequency decreased drastically because the mobility of the ionic charge carriers increased with increasing temperature. However, above 230° C., the $f_{min}$ frequency remained constant with increasing temperature. Above $4 \times 10^5$ Hz, the minimum dielectric constant was relatively insensitive to the frequency. Below $4 \times 10^5$ Hz, however, the dielectric constant dropped dramatically over a very small frequency interval due to increased contribution of the sluggish ionic charge carriers.

The conductivity of the doped PBI was also measured as a function of frequency and temperature. The effects of frequency and temperature on the conductivity were very similar to those observed in the dielectric constant measurements. The overall conductivity increased with increasing temperature, reaching a maximum at a frequency between $1 \times 10^5 \sim 1 \times 10^6$ Hz. The conductivity measured at 10 Hz at a temperature of 300° C. was three orders of magnitude higher than that measured at 10 Hz at a temperature of 25° C. (FIG. 3(a)). Above 160° C., the conductivity increased very rapidly with temperature and displayed a peak at a frequency of $\sim 1 \times 10^5$ Hz. This was fairly close to the frequency at which the dielectric constant reached its most negative value.

The maximum conductivity as a function of frequency ($f_{max}$) was recorded at each temperature. The maximum conductivity slightly increased over the temperature range of 25 to 120° C. At 130° C., the maximum conductivity began to decrease gradually, and above 160° C., it increased steeply and reached $4.90 \times 10^{-3}$ S/cm at a temperature of 300° C., showing a plateau. The discontinuous transition was at 160° C. Below 150° C., the frequency ($f_{max}$) of maximum conductivity was insensitive to increasing temperature. Above 160° C., however, the frequency ($f_{max}$) of maximum conductivities dropped dramatically, plateauing at about $1 \times 10^5$ Hz. Above $4 \times 10^5$ Hz, the maximum conductivity was relatively insensitive to the frequency. Below $4 \times 10^5$ Hz, however, the maximum conductivity increased dramatically with decreasing frequency over a very small frequency interval.

Without wishing to be bound to any one theory, it is believed that the temperature dependence of the conductivity is due to the mobility of ions in the inventors' materials. Above 160° C., the mobility of ions began to increase because of the increased mobility of the chain segments of PBI at that temperature. The temperature dependence of the dielectric and conductivity data suggested a glass transition temperature of about 160° C. This was consistent with a glass transition temperature of about 170° C. measured by a dynamic mechanical analyzer.

Without wishing to be bound by any one theory with respect to the dielectric constant and the conductivity data, it is believed that the origin of negative dielectric constant with the resonance behavior is attributed to the mobility of ions of the doped PBI at elevated temperatures. Accordingly, this effect of mobility of ions on dielectric constant can be explained by two approaches: a microscopic approach explained by ionic plasma resonation and a macroscopic approach explained by an induction effect.

For the microscopic approach to explain the negative dielectric behavior, the plasma frequency, $\omega_p$ of the doped PBI can be considered. The ions oscillation under an electric field at lower plasma frequency ($\omega_p^*$) than a normal electron oscillation, given by $\omega_p^* \approx \omega_p \cdot (m_e/m_i)^{0.5}$. Furthermore, both the interaction between electrons and ions and the lower density of charge can reduce the ion oscillation frequency. For the macroscopic approach, the induction effect on the negative dielectric constant was known to exist in a composite comprised of conductive rod-fillers in a dielectric matrix. The dispersion of the effective dielectric constant can range from a relaxation type to a resonance one, depending on the conductivity of the inclusion and their dimension. It has been reported that low conductivity inclusions influence the relaxation spectrum and high conductivity inclusions influenced the resonance spectrum at a high frequency. Conductive thin rods interact with an external field like dipoles and the skin effect increased with increasing frequency. In embodiments of the invention, at temperatures below 160° C., the conductivity was not high enough, so the material displayed a dielectric relaxation type spectrum. Above 160° C., however, the conductivity became so high that a resonance type spectrum appeared with a negative dielectric constant at kHz frequencies. It is likely that the downshift of the resonance frequency with an increase in temperature has arisen from the increase in conductivity.

Finally, an effect of dopant concentration on the negative dielectric constant behavior was investigated. In the cases of PBI doped with 50 or 60 wt % phosphoric acid measured at 300° C., the dielectric constant increased with decreasing frequency at below resonance frequency (shown in FIG. 3A). At low frequency, the dielectric constant of the PBI doped with 60 wt % phosphoric acid was higher than that of the PBI doped with 50 wt % phosphoric acid, which was expected because of higher concentration of mobile ions. Also, the PBI doped with 60 wt % phosphoric acid showed a lower resonance frequency, a $f_{res}$ and a more negative dielectric constant at a lower frequency, $f_{min}$. Even at room temperature, the 60 wt % doped PBI showed a negative dielectric constant of −84.1 at $1.53 \times 10^6$ Hz. The 60 wt % doped PBI showed a higher peak (max) conductivity ($9.4 \times 10^{-3}$) at a lower frequency, $f_{min}$ ($7.0 \times 10^4$ Hz) than the 50 wt % doped PBI ($4.9 \times 10^{-3}$ S/cm at $10 \times 10^5$ Hz), which is related to the negative dielectric constant behavior (show in FIG. 3B). It was found that the effect of increasing concentration of phosphoric acid on the negative dielectric constant was similar to that of increasing temperature on the negative dielectric constant because of higher mobility of ions.

Embodiments of the invention have at least the following features benefits: (1) the PBI doped with phosphoric acid displays a negative dielectric constant due to the resonance behavior of the high mobility of ions at high frequencies and elevated temperatures; (2) the effective negative dielectric constant and resonance frequency can be controlled by temperature, concentration and effective mass of dopant; (3) the ion-doped materials of embodiments of the invention can be used to create novel negative dielectric constant materials and negative index materials; (4) the ion-doped materials of embodiments of the invention can be used to create novel optical and microwave devices; and (5) the ion-doped materials of embodiments of the invention can function as a structural element and a medium for power generation and energy storage, a sensor and/or an actuator.

The novel ion-doped negative dielectric materials of embodiments of the invention provide a new method for preparing metamaterials (negative index materials, NIM) with controllable resonance frequencies from radio to optical frequency. Potential applications for the novel negative dielectric materials of embodiments of the invention include, but are not limited to, the following:

(1) Commercial Applications (including Aerospace Applications)

(a) Superlens (perfect lens): Conventional lenses have a resolution on the order of one wavelength due to the so-called diffraction limit, This limit makes it impossible to image very small objects, such as individual atoms, which have sizes many times smaller than the wavelength of visible light. A superlens is able to overcome the diffraction limit. A very well-known superlens is the perfect lens described by John Pendry (J. B. Pendry, *Phys. Rev. Lett.*, 85, 3966 (2000); see also http://en.wikipedia.orgwikiMetamaterial; (http://en.wikipedia.orgwikiSuperlens), which uses a slab of material with a negative index of refraction as a flat lens. In theory, Pendry's perfect lens is capable of perfect focusing—meaning that it can perfectly reproduce the electromagnetic field of the source plane at the image plane. A superlens is a lens which is capable of subwavelength imaging. Recently, experimental realizations of the superlens have been achieved. The resolution capability was extended to 1/26 of the illumination wavelength, providing unprecedented image details 15 nm and below.

(b) Optical Power Limiting: NIM is applicable to make an optical power limiting device providing protection of the human eye against accidental or deliberate exposure to laser radiation for commercial and military applications. The optical power limiting device utilizes planar NIM layers for optical focusing and conventional nonlinear two-phonon absorbing materials layers for limiting the optical power.

(c) Optical switch, modulator, etc: Photoswitchable optical negative index materials showing a remarkable tuning range of refractive index in the communication wavelength can be achieved.

(d) Microwave and Related Applications: NIM materials make it possible to achieve several applications that are not possible or would be difficult without a magnetic response. For example, the new negative dielectric material enables the production of "ultra-thin film inductors" which have unlimited applications for the integration of electronics to pursue lightweight, flexibility, ultra small size and durability, in comparison with general "bulk solenoid inductors". The new materials make it possible to achieve several other applications such as waveguides and antenna, filters, and electromagnetic cloaking devices. The inductance and resonant frequency of the thin film inductors also can be tailorable by controlling the doping level.

(e) Perfect Absorbers: An absorbing metamaterial with unity absorbance (A=1) can be developed by controlling resonance conditions, from radio, microwave, mm-wave, THz, MIR, NIR, FIR, to optical range.

(f) Nondestructive Evaluation Technique: NIM material increases the sensitivity of the microwave nondestructive evaluation method for detection of defects that are small relative to a wavelength. Such a sensor can be designed on the basis of a negative index material lens.

(2) Military Applications (a) Cloaking (Stealth): NIM materials pave the way to conceptually novel ways of making a given object "invisible" to electromagnetic radiation, potentially overcoming some of the inherent limitations of some camouflaging techniques. The mechanisms typically involve surrounding the object to be cloaked with a shell which affects the passage of light near it. Metamaterials have managed to cloak an object in the microwave spectrum using special concentric rings; the microwaves were barely affected by the presence of the cloaked object. Recently, a metamaterial with a negative index of refraction for visible light wavelengths was announced in the art. The material had an index of 0.6 at 780 nanometers.

(b) High-frequency battlefield communication: NIM materials make it possible to make lightweight, flexible, ultra small size and durable antennas applicable for wearable electronics such as multifunctional military suits.

Other potential applications for novel ion-doped negative dielectric materials include, but are not limited to, the following: (1) lightweight, compact lenses with improved optics, (which may be used, e.g., to read ultra-high-capacity DVDs); 2) sub wavelength/high resolution imaging across the electromagnetic spectrum, including microwave, radio (RF), IR, ultraviolet (UV), and X-ray; 3) novel approaches to beam steering for radar, antenna, radio frequency, and/or optical communications; and 4) novel approaches for integrating optics with semiconductor electronics for communication devices of aerospace vehicles.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An effectively homogeneous negative dielectric material comprising:
   a doped dielectric material comprising a polymer or a polymer composite dielectric material doped with an aqueous acid solution having an acid concentration of about 50 wt % to about 60 wt %;
   wherein the doped dielectric material is heated under vacuum to form the effectively homogeneous negative dielectric material which is homogenous at a molecular level; and
   wherein the effectively homogeneous negative dielectric material has a negative dielectric constant at megahertz frequencies.

2. The negative dielectric material of claim 1, wherein the dielectric material further comprises nonmetal ions.

3. The negative dielectric material of claim 2, wherein the nonmetal ions are selected from the group consisting of phosphate, chloride, chlorite, fluoride, iodide, ammonium ion, or combinations thereof.

4. The negative dielectric material of claim 1, wherein the aqueous acid solution comprises aqueous phosphoric acid.

5. The negative dielectric material of claim 1, wherein a plasma frequency and an dielectric constant of the material are controlled by concentration and effective mass of dopant ions and by operating temperature.

6. The negative dielectric material of claim 5, wherein the material is characterized with an optical property that is tailored by controlling a plasma frequency.

7. The negative dielectric material of claim 1, wherein a resonance type of conductivity of the material is controlled by concentration and effective mass of dopant ions and by operating temperature.

8. The effectively homogenous negative dielectric material of claim 1, wherein the polymer comprises poly(benzimidazole).

9. A negative index material comprising:
   an effective homogeneous negative dielectric material comprising a polymer or a polymer composite dielectric material doped with an aqueous acid solution having an acid concentration of about 50 wt % to about 60 wt % to form a doped dielectric material;
   wherein the doped dielectric material is heated under vacuum to form the effectively homogeneous negative dielectric material which is homogenous at a molecular level; and
   wherein the effectively homogeneous negative dielectric material has a negative dielectric constant at megahertz frequencies.

10. The negative index material of claim 9, wherein the polymer comprises poly(benzimidazole).

11. The negative index material of claim 9, wherein the aqueous acid solution comprises aqueous phosphoric acid.

12. An optical or microwave device comprising:
   an effectively homogeneous negative dielectric material comprising a polymer or a polymer composite dielectric material doped with an aqueous acid solution having an acid concentration of about 50 wt % to about 60 wt % to form a doped dielectric material;
   wherein the doped dielectric material is heated under vacuum to form the effectively homogeneous negative dielectric material which is homogenous at a molecular level; and
   wherein the effectively homogeneous negative dielectric material has a negative dielectric constant at megahertz frequencies.

13. The device of claim 12, wherein the device is an optical device characterized as a perfect lens, an optical power limiting device, or an optical switch.

14. The device of claim 12, wherein the device is a microwave device characterized as an antenna, a filter, or a cloaking device.

15. The optical or microwave device of claim 12, wherein the polymer comprises poly(benzimidazole).

16. The optical or microwave device of claim 12, wherein the aqueous acid solution comprises aqueous phosphoric acid.

* * * * *